(12) United States Patent
Leenknegt et al.

(10) Patent No.: US 9,999,176 B2
(45) Date of Patent: Jun. 19, 2018

(54) OPTICAL TAILINGS SENSOR IN TRI-SWEEP TAILINGS HOUSING

(71) Applicant: CNH Industrial America LLC, New Holland, PA (US)

(72) Inventors: Arno Leenknegt, Hooglede (BE); Dré Waltherus Joachim Jongmans, Klundert (NL); Glenn Aesaert, Izegem (BE); Richard P. Strosser, Akron, PA (US); Jeffrey D. Thomas, Gordonville, PA (US); Curtis F. Hillen, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 49 days.

(21) Appl. No.: 15/142,396

(22) Filed: Apr. 29, 2016

(65) Prior Publication Data
US 2017/0311543 A1 Nov. 2, 2017

(51) Int. Cl.
*A01D 41/127* (2006.01)
*A01F 12/52* (2006.01)
*A01F 7/06* (2006.01)
*A01F 12/44* (2006.01)

(52) U.S. Cl.
CPC ............ *A01D 41/1272* (2013.01); *A01F 7/06* (2013.01); *A01F 12/444* (2013.01); *A01F 12/446* (2013.01); *A01F 12/52* (2013.01)

(58) Field of Classification Search
CPC . A01F 2012/188; A01F 12/52; A01D 41/127; A01D 41/1272
USPC ................................................ 460/4, 13, 14
See application file for complete search history.

(56) References Cited

U.S. PATENT DOCUMENTS

| 4,296,409 | A | * | 10/1981 | Whitaker | ............. A01D 41/127 340/459 |
| 4,441,513 | A | * | 4/1984 | Herwig | ................ A01D 41/127 250/223 R |
| 5,569,081 | A | | 10/1996 | Baumgarten et al. | |
| 5,750,877 | A | | 5/1998 | Behnke et al. | |
| 5,913,801 | A | | 6/1999 | Böttinger et al. | |

(Continued)

FOREIGN PATENT DOCUMENTS

EP     3 000 302 A1    3/2016

OTHER PUBLICATIONS

European Search Report for European Application No. 17168789.0 dated Jul. 31, 2017 (7 pages).

*Primary Examiner* — John Weiss
(74) *Attorney, Agent, or Firm* — Patrick Sheldrake

(57) ABSTRACT

A tailings conveyance including a housing having a front plate, a back plate, and a wall, and is adapted to recycle tailings through a cleaning system of a combine using at least one impeller. The wall of the housing describes an arc near the impeller paddles over a segment of a circle described by the circumference of the impeller. The wall further continues on a tangent away from the circle at a point of tangency. A sensor is positioned proximate to the point of tangency, and senses whether a space between the front plate and the back plate directly adjacent to the sensor is obscured by tailings as the impeller rotates. A controller or control system connected to the sensor calculates an amount or percentage of time the space between the front plate and the back plate directly adjacent to the sensor is obscured by tailings as the impeller rotates.

21 Claims, 4 Drawing Sheets

(56) References Cited

U.S. PATENT DOCUMENTS

| | | | | |
|---|---|---|---|---|
| 6,125,702 | A * | 10/2000 | Kuchar | A01D 41/1271 56/10.2 R |
| 6,282,967 | B1 * | 9/2001 | Homburg | A01D 41/1272 73/861 |
| 6,342,006 | B1 * | 1/2002 | Bauch | A01D 41/1276 460/4 |
| 7,025,673 | B2 * | 4/2006 | Schmidt | A01F 12/52 460/114 |
| 7,362,233 | B2 * | 4/2008 | Behnke | A01D 41/1276 340/684 |
| 7,630,808 | B2 | 12/2009 | Behnke et al. | |
| 8,282,453 | B1 | 10/2012 | Hillen et al. | |
| 9,510,513 | B2 * | 12/2016 | Wilde Von Wildemann | A01F 7/00 |
| 2004/0137973 | A1 * | 7/2004 | Schmidt | A01F 12/52 460/13 |
| 2010/0217481 | A1 | 8/2010 | Baumgarten et al. | |
| 2012/0245802 | A1 | 9/2012 | Schlesser et al. | |
| 2016/0044869 | A1 | 2/2016 | Mayerle | |

\* cited by examiner

OPTICAL TAILINGS SENSOR IN TRI-SWEEP TAILINGS HOUSING

BACKGROUND OF THE INVENTION

1. Field of the Invention

The present invention relates to agricultural harvesters, and, more specifically to tailings sensors in the tailings conveyance of a combine.

2. Description of the Related Art

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Meanwhile, incompletely cleaned grain, called tailings, may include incompletely threshed or unthreshed crop, free grains of completely threshed crop, and other plant material or Material Other than Grain (MOG). Such tailings from the upper or lower sieve having fallen onto the tailings auger pan are recycled through the cleaning system. Often, a return auger or tailings conveyance receives the tailings from a tailings auger at the forward end of the auger pan, and lifts the tailings vertically in order to recycle the tailings through the threshing and separating or cleaning system. In order to measure the amount or volume of tailings recycling through the threshing and separating or cleaning system, it is known to provide a sensor, which is often a mechanical arm type of sensor which is not solid state, such as a potentiometer or rotary hall effect sensor. However, various difficulties arise from the use of prior art sensor arrangements in association with tailings conveyances. Currently utilized mechanical arm type sensors suffer from lack of durability, and often become stuck, thereby providing false readings to the operator. Further, currently utilized sensors often do not accurately depict the volume of tailings moving through the tailings conveyance due to poor positioning of the sensor and the diffuse nature of tailings flow through the tailings conveyance.

What is needed in the art, therefore, is a way to accurately measure the amount or volume of tailings moving through a tailings conveyance.

SUMMARY OF THE INVENTION

The present invention provides such a way to accurately measure the amount and/or volume of tailings moving through a tailings conveyance. Embodiments of the present invention are implemented on a tailings conveyance that functions to recycle tailings through a threshing and separating or cleaning system of an agricultural harvester, and in doing so may further thresh the tailings. The tailings conveyance has a housing including a front plate, a back plate, and a housing wall, as well as one or more rotating element such as impellers for propelling the tailings vertically upwards for recycling through the threshing and separating or cleaning system.

Embodiments of the present invention may utilize at least one optical sensor, which may include an optical emitter mounted to the front plate or to the back plate, and an optical receiver mounted to the opposite of the front plate or back plate. The at least one optical sensor may be located near the outer radius of a circle described by protrusions of the rotating element, for example impeller paddles as the impeller rotates, and may be positioned at, just before, or just after of a point of tangency where the housing wall continues on a tangent away from the circle described by the protrusions of the rotating element, such as the impeller paddles. In this way, the tailings, which enter into the tailings conveyance in a relatively diffuse state, become defined and compressed due to the tangential force provided by the protrusions of the rotating element, for example impeller paddles, and due to centripetal force provided by the curved housing wall. By placing the at least one optical sensor at, just before, or just after the point of tangency, the at least one optical sensor takes advantage of the maximum effect of compaction of the tailings just before the tailings depart from the protrusions of the rotating element, for example the impeller paddles, on their way vertically upwards through the tailings conveyance, after which the tailings again return to a relatively diffuse state and measurement thereof becomes significantly more difficult.

The at least one optical sensor detects at a high instantaneous rate whether the space between the optical emitter and optical receiver is obscured by the tailings material or by the protrusions of the rotating element, for example impeller paddles as the impeller rotates. A control system or controller connected to the at least one optical sensor may calculate using information from the at least one optical sensor the amount or percentage of time that the space between the optical emitter and optical receiver is obscured by the tailings. Using the at least one optical sensor to calculate the angular velocity of the rotating element or impeller according to the frequency of obscurance and known number of protrusions of the rotating element, for example impeller paddles on the impeller, the control system or controller may calculate the total volume of the tailings passing through the rotating element or impeller, and thereby the total volume of the tailings passing through the tailings conveyance. The control system or controller may deduct from the amount or percentage of time that the space between the optical emitter and optical receiver is obscured, such amount or percentage of time that is attributable to the protrusions of the rotating element, for example to the impeller paddles themselves.

The at least one optical sensor may include an optical emitter and an optical receiver, or may use at least one sensor having a combined emitter and receiver positioned opposite a reflector. Alternately, an optoelectronic sensor or photo diode may be used having the capability to measure the distance to the surface directly in front of the at least one sensor, in order to determine if the space between the at least one sensor and the opposite housing front plate or housing back plate is occupied by tailings at a given instant. Still alternately, other types of sensor may be used, such as acoustic or electrical sensors, provided that such sensor detects at a high instantaneous rate whether the space between the housing front plate and the housing back plate adjacent to the at least one sensor is obscured by the tailings as the rotating element or impeller rotates.

The invention in one form is directed to a tailings conveyance adapted to recycle tailings through a threshing and separating or cleaning system of an agricultural harvester. The tailings conveyance includes a housing having an inlet, an outlet, a front plate, a back plate, and a wall. The tailings conveyance has at least one rotating element having at least one protrusion. The wall describes an arc proximate to the at least one protrusion over a segment of a circle described by the at least one protrusion as the at least one rotating element rotates. The wall further continues on a tangent away from the circle described by the at least one protrusion at a point of tangency. At least one sensor senses whether a space between the front plate and the back plate directly adjacent to the at least one sensor is obscured by tailings as the at least one rotating element rotates. The at least one sensor is positioned proximate to the point of tangency. A controller or a control system connected to the at least one sensor calculates an amount or a percentage of time the space between the front plate and the back plate directly adjacent to the at least one sensor is obscured by tailings as the at least one rotating element rotates.

The invention in another form is directed to a system for measuring a volume of tailings passing through a tailings conveyance. The tailings conveyance is adapted to recycle tailings through a threshing and separating system or cleaning system of an agricultural harvester. The tailings conveyance has a housing having an inlet, an outlet, a front plate, a back plate, and a wall. The tailings conveyance has at least one rotating element having at least one protrusion. The wall of the tailings conveyance describes an arc proximate to the at least one protrusion over a segment of a circle described by the at least one protrusion as the at least one rotating element rotates. The wall of the tailings conveyance further continues on a tangent away from the circle described by the at least one protrusion at a point of tangency. At least one sensor senses whether a space between the front plate and the back plate directly adjacent to the at least one sensor is obscured by tailings as the at least one rotating element rotates. The at least one sensor is positioned proximate to the point of tangency. A controller or a control system connected to the at least one sensor calculates an amount or a percentage of time the space between the front plate and the back plate directly adjacent to the at least one sensor is obscured by tailings as the at least one rotating element rotates.

The invention in another form is directed to a method for measuring a volume of tailings passing through a tailings conveyance. The tailings conveyance is adapted to recycle tailings through a threshing and separating or cleaning system of an agricultural harvester. The tailings conveyance has a housing having an inlet, an outlet, a front plate, a back plate, and a wall. The tailings conveyance has at least one rotating element having at least one protrusion. The wall of the tailings conveyance describes an arc proximate to the at least one protrusion over a segment of a circle described by the at least one protrusion as the at least one rotating element rotates. The wall of the tailings conveyance further continues on a tangent away from the circle described by the at least one protrusion at a point of tangency. The method includes several steps. The first step is positioning at least one sensor proximate to the point of tangency. The second step is sensing with the at least one sensor whether a space between the front plate and the back plate directly adjacent to the at least one sensor is obscured by tailings as the at least one rotating element rotates. The third step is calculating with a controller or a control system connected to the at least one sensor an amount or a percentage of time the space between the front plate and the back plate directly adjacent to the at least one sensor is obscured by tailings as the at least one rotating element rotates.

An advantage of the present invention is that it accurately measures the amount and/or volume of tailings moving through a tailings conveyance despite the diffuse nature of tailings flowing through the tailings conveyance. Another advantage is that the sensor used is solid state, and therefore robust, accurate, and reliable.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material that is threshed and separated from the discardable part of the crop material, which is referred to as non-grain crop material, MOG or straw. Incompletely threshed crop material, which may include unthreshed crop, free grains of completely threshed crop, and other Material Other than Grain (MOG), is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
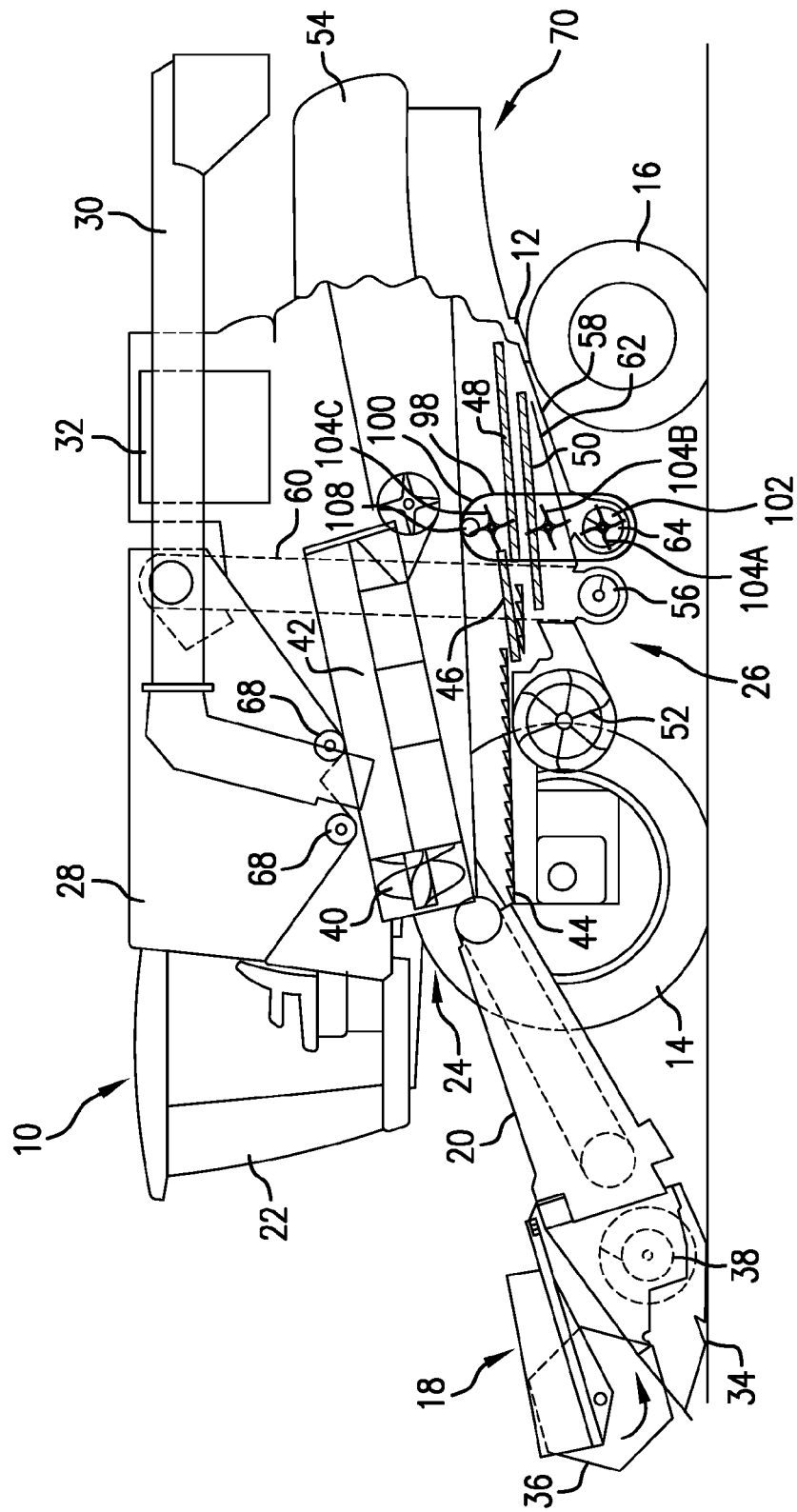
FIG. 1 is a side view of an agricultural harvester in the form of a combine.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc. The front wheels 14 are larger flotation type wheels, and rear wheels 16 are smaller steerable wheels. Motive force is selectively applied to the front wheels 14 through a power plant in the form of a diesel engine 32 and a transmission (not shown).

Although the combine 10 is shown as including wheels, is also to be understood that the combine 10 may include tracks, such as full tracks or half-tracks. The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves to remove MOG, residue, chaff, and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. The cross augers 68 at the bottom of the grain tank 28 convey the clean grain within the grain tank 28 to the unloading auger 30 for discharge from the combine 10. A residue handling system 70 integrated in the rear of the harvester 10 receives airborne MOG, residue, and chaff from the threshing and separating system 24 and from the cleaning system 26.

Meanwhile, tailings from the cleaning system 26 fall to a tailings auger pan 62. The tailings are transported via tailings auger 64 to a tailings conveyance 98. The tailings enter the tailings conveyance 98 by way of a tailings conveyance inlet 102. The tailings conveyance 98 then returns the tailings back to the upper sieve 48 and/or pre-cleaning sieve 46, or to the threshing and separating system 24, for repeated cleaning action. In doing so, the tailings are further threshed by impellers 104A, 104B, and/or 104C as they move the tailings vertically upwards towards a tailings conveyance outlet 108 leading to the upper sieve 48 and/or pre-cleaning sieve 46, or to the threshing and separating system 24.

Figure 2:
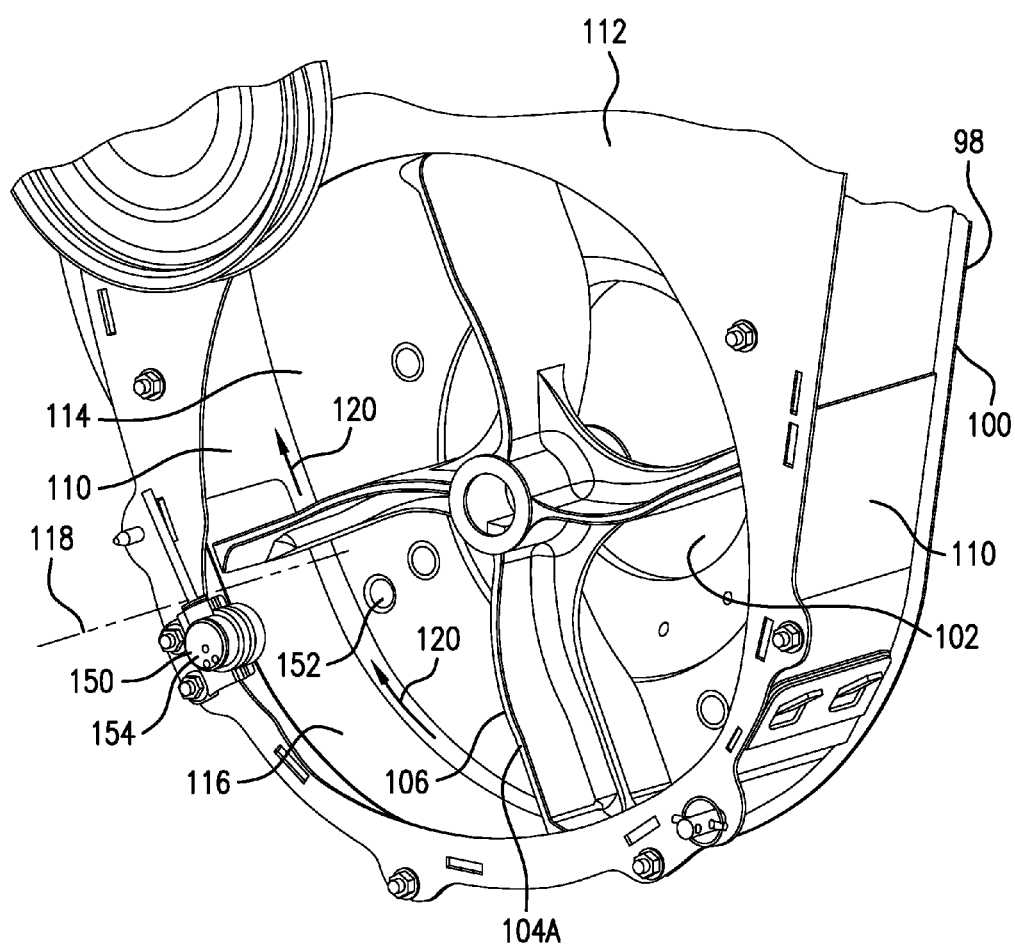
FIG. 2 is an isometric view of a tailings conveyance having an optical sensor according to an embodiment of the invention.
Figure 3:
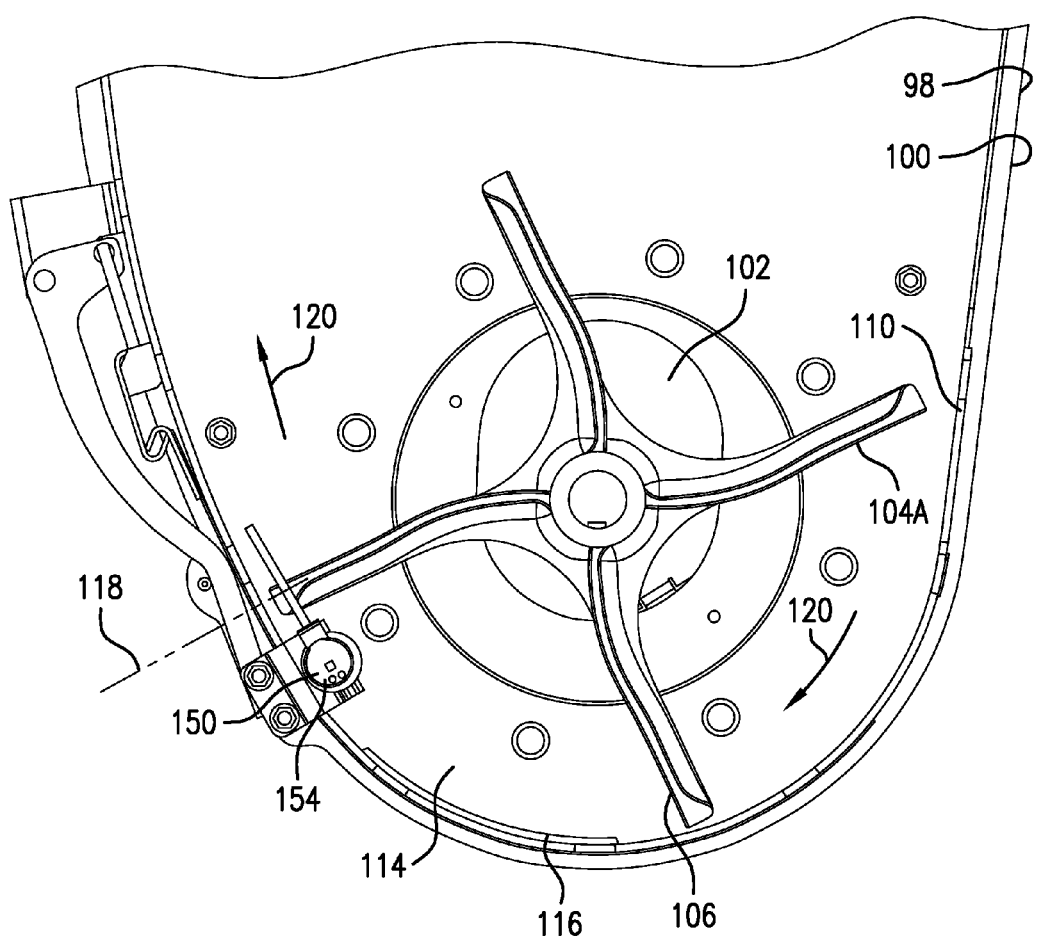
FIG. 3 is a front view of a tailings conveyance having an optical sensor according to an embodiment of the invention.

Turning now to FIGS. 2 and 3, a tailings conveyance 98 is shown having a housing 100. The housing 100 has a housing front plate 112, a housing back plate 114, and a housing wall 110. The housing front plate 112 is shown partially cut away in FIG. 2, in order to better illustrate the inner workings of the tailings conveyance 98. Tailings enter the housing 100 of the tailings conveyance 98 through tailings conveyance inlet 102, where the tailings are energetically moved in direction 120 by the impeller paddles 106 of impeller 104A. In the process of moving the tailings upwards towards the tailings conveyance outlet 108 (not shown in FIGS. 2 and 3), the tailings may pass over one or more threshing plates 116 attached to the housing wall 110, which assist in further threshing the tailings before they are deposited on the upper sieve 48 and/or pre-cleaning sieve 46 (also not shown in FIGS. 2 and 3).

In order to monitor the volume of tailings material entering and moving through the tailings conveyance 98, an optical sensor 150 is mounted to the housing 100. In one embodiment, the optical sensor 150 includes an optical emitter 152 mounted to the housing back plate 114 and an optical receiver 154 mounted to the housing front plate, facing the optical emitter 152. Alternately, the optical emitter 152 may be mounted to the housing front plate 112 and the optical receiver 154 may be mounted to the housing back plate 114. The optical emitter 152 and the optical receiver 154 are located near the outer radius of a circle described by the impeller paddles 106 as the impeller 104 rotates. Further, the optical emitter 152 and the optical receiver 154 are positioned at, just before, or just after of a point of tangency 118 where the housing wall 110 continues on a tangent away from the circle described by the impeller paddles 106 as the impeller 104 rotates.

Figure 4:
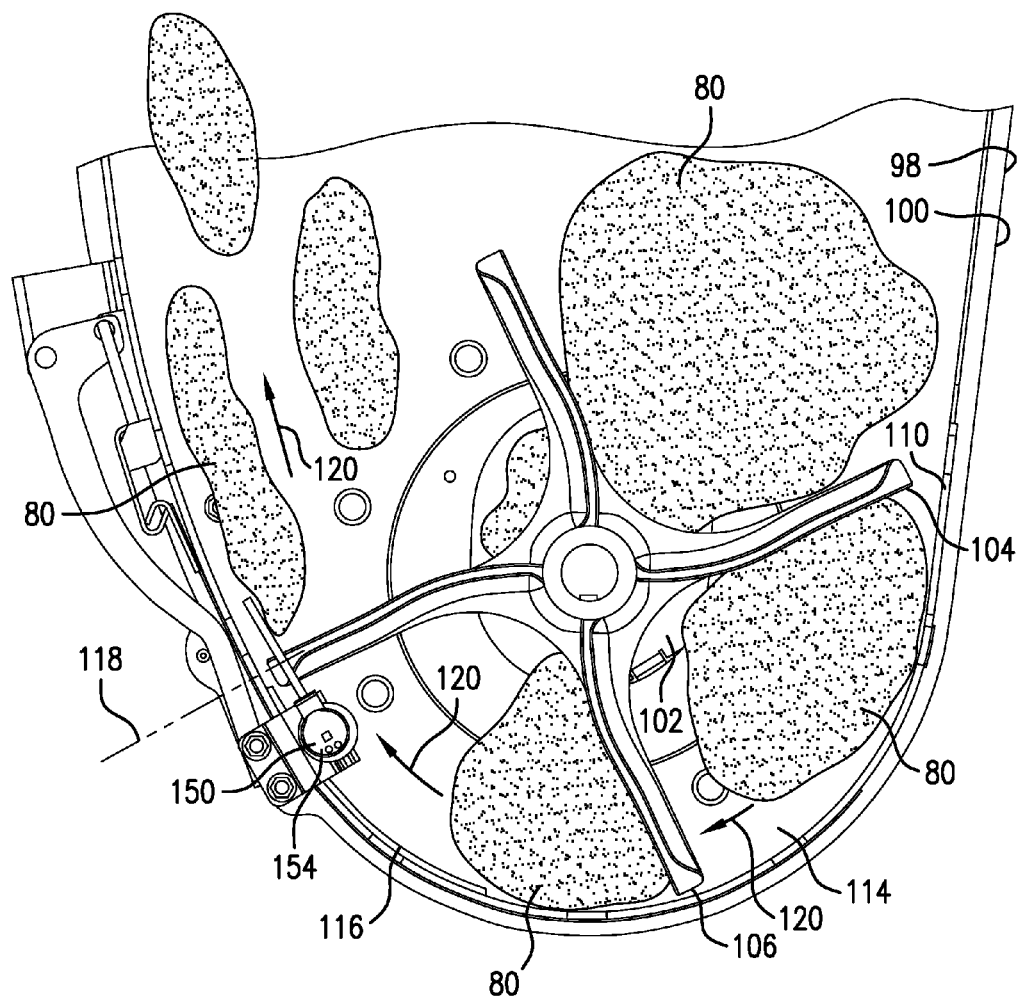
FIG. 4 is a front view of a tailings conveyance having an optical sensor according to an embodiment of the invention.

Turning now to FIG. 4, tailings conveyance 98 is again shown having housing 100 and tailings conveyance inlet 102. The housing 100 again has a housing back plate 114, a housing wall 110, and one or more threshing plates 116 attached to the housing wall 110. Housing front plate 112 is removed, as in FIG. 3, in order to better illustrate the functioning of this embodiment of the invention. Tailings 80 enter the housing 100 of the tailings conveyance 98 through the tailings conveyance inlet 102. The tailings 80, which enter into the impeller 104 in a comparatively diffuse state, are energetically moved in direction 120 by the impeller paddles 106 of impeller 104. Due to tangential force provided by the impeller paddles 106 and due to centripetal force provided by the curved housing wall 110, the volume of tailings 80 defined by two adjacent impeller paddles 106 and the housing wall 110 becomes defined and compressed, at least temporarily, against the pushing impeller paddle 106 and the curved housing wall 110.

Again, optical sensor 150, including optical emitter 152 and optical receiver 154, are positioned at, just before, or just after of the point of tangency 118 where the housing wall 110 continues on a tangent away from the circle described by the impeller paddles 106 as the impeller 104 rotates. In this position, the optical sensor 150 takes advantage of the maximum effect of compaction of the tailings 80 due to tangential force provided by the impeller paddles 106 and due to centripetal force provided by the curved housing wall 110. The optical sensor 150 then detects at a high instantaneous rate whether the space between the optical emitter 152 and optical receiver 154 is obscured by the tailings 80 as the impeller 104 rotates. The optical sensor 150 may be positioned up to 5° before or after the point of tangency 118 where the housing wall 110 continues on a tangent away from the circle described by the impeller paddles 106 as the impeller 104 rotates. Alternately, the optical sensor 150 may be positioned up to 15° before or after the point of tangency 118 where the housing wall 110 continues on a tangent away from the circle described by the impeller paddles 106 as the impeller 104 rotates. Alternately, the optical sensor 150 may be positioned up to 30° before or after the point of tangency 118 where the housing wall 110 continues on a tangent away from the circle described by the impeller paddles 106 as the impeller 104 rotates.

A control system or controller (not shown) connected to the optical sensor 150 may then calculate using information from the optical sensor 150 the amount or percentage of time that the space between the optical emitter 152 and optical receiver 154 is obscured by the tailings 80, compared to the amount or percentage of time that the space between the optical emitter 152 and optical receiver 154 is clear. The control system or controller may use the optical sensor 150 to calculate the angular velocity of the impeller 104, according to the frequency of obscurance and known number of impeller paddles 106 on the impeller 104, and using this information may deduct from the amount or percentage of time that the space between the optical emitter 152 and optical receiver 154 is obscured, such amount or percentage of time that is attributable to the impeller paddles 106 themselves. Further, using information from the optical sensor 150 to calculate the amount or percentage of time that the space between the optical emitter 152 and optical receiver 154 is obscured by the tailings 80, and/or using the angular velocity of the impeller 104 to calculate the tangential velocity of the tailings 80, the control system or controller may calculate the total amount and/or volume of the tailings 80 passing through the impeller 104, and thereby the total amount and/or volume of the tailings 80 passing through the tailings conveyance 98.

Accuracy of the optical sensor 150 and the information regarding the total amount and/or volume of the tailings 80 passing through the tailings conveyance 98 is dependent upon the afore described compaction of the tailings, which again is at a maximum just before the point of tangency 118 where the housing wall 110 continues on a tangent away from the circle described by the impeller paddles 106 as the impeller 104 rotates. Beyond this point, as the tailings 80 depart from the impeller paddles 106, the tailings 80 again become diffused, so that measurement of the amount or percentage of time that the space between the optical emitter 152 and optical receiver 154 is obscured is less accurate, making it significantly harder to calculate the total amount and/or volume of the tailings 80 passing through the tailings conveyance 98.

In each of the embodiments of the present invention shown in FIGS. 2-4, the optical sensor 150 includes an optical emitter 152 and an optical receiver 154. However, it is contemplated as being within the scope of the invention that another type of optical sensor may be used, such as a sensor having a combined emitter and receiver positioned on the housing front plate 112 or housing back plate 114, and a reflector positioned on the opposite housing front plate 112 or housing back plate 114. Alternately, an optoelectronic sensor or photo diode may be used having the capability to directly measure the distance to the surface directly in front of the sensor at a high instantaneous rate, in order to determine if the space between the sensor and the opposite housing front plate 112 or housing back plate 114 is occupied by tailings 80. Still alternately, other types of sensor may be used, such as acoustic or electrical sensors, provided that such sensor detects at a high instantaneous rate whether the space between the housing front plate 112 and the housing back plate 114 in the position described above is obscured by the tailings 80 as the impeller 104 rotates.

Further, in each of the embodiments of the present invention shown in FIGS. 2-4, the optical sensor 150 is shown used on a tailings conveyance 98 for returning tailings back to the upper sieve 48 and/or pre-cleaning sieve 46 for repeated cleaning action. However, it is contemplated that the optical sensor 150 and control system or controller arrangement may be utilized in any conveyance or processing device, such as a rethreshing drum, utilizing a rotating element having at least one protrusion wherein a total amount and/or volume of material moving through the conveyance or device is to be calculated, where such device comes within the limits of the appended claims.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tailings conveyance adapted to recycle tailings through a threshing and separating or cleaning system of an agricultural harvester, comprising:
    a housing having an inlet, an outlet, a front plate, a back plate, and a wall;
    at least one rotating element having at least one protrusion;
    said wall describing an arc proximate to said at least one protrusion over a segment of a circle described by said at least one protrusion as said at least one rotating element rotates, said wall further continuing on a tangent away from said circle described by said at least one protrusion at a point of tangency;
    at least one sensor sensing whether a space between said front plate and said back plate directly adjacent to said at least one sensor is obscured by tailings as said at least one rotating element rotates;
    said at least one sensor being positioned proximate to said point of tangency that corresponds to a place of maximum compaction of the tailings; and
    at least one of a controller and a control system connected to said at least one sensor and calculating at least one of an amount of time or a percentage of time said space between said front plate and said back plate directly adjacent to said at least one sensor is obscured by tailings as said rotating element rotates causing the maximum compaction of the tailings.

2. The tailings conveyance of claim 1, wherein:
    said at least one rotating element further comprises at least one impeller; and
    said at least one protrusion further comprises at least one impeller paddle.

3. The tailings conveyance of claim 2, wherein:
    said at least one sensor being positioned within 30° of said point of tangency.

4. The tailings conveyance of claim 3, wherein:
    said at least one sensor being positioned within 15° of said point of tangency.

5. The tailings conveyance of claim 4, wherein:
    said at least one sensor being positioned within 5° of said point of tangency.

6. The tailings conveyance of claim 2, wherein:
    said at least one of a controller and a control system further calculating an angular velocity of said impeller, said at least one of a controller and a control system further calculating at least one of:
        an amount or a percentage of time to deduct to account for said at least one impeller paddle;
        a velocity of said tailings; and
        a total volume of said tailings passing through said tailings conveyance.

7. The tailings conveyance of claim 2, wherein:
    said at least one sensor further comprising at least one of:
        at least one optical sensor having an emitter and a receiver, one of said emitter and receiver being mounted on said front plate, and the other of said emitter and receiver being mounted on said back plate;
        at least one optical sensor having a combined emitter and receiver, and a reflector, one of said combined emitter and receiver and said reflector being mounted on said front plate, and the other of said combined emitter and receiver and said reflector being mounted on said back plate; and
        at least one optoelectronic sensor or photo diode able to directly measure a distance to a surface directly in front of said at least one sensor.

8. A system for measuring a volume of tailings passing through a tailings conveyance, the tailings conveyance adapted to recycle tailings through a threshing and separating or cleaning system of an agricultural harvester, the tailings conveyance having a housing having an inlet, an outlet, a front plate, a back plate, a wall, at least one rotating element having at least one protrusion, the wall describing an arc proximate to the at least one protrusion over a segment of a circle described by the at least one protrusion as the rotating element rotates, the wall further continuing on a tangent away from the circle described by the at least one protrusion at a point of tangency, comprising:
    at least one sensor sensing whether a space between the front plate and the back plate directly adjacent to said at least one sensor is obscured by tailings as the at least one rotating element rotates;
    said at least one sensor being positioned proximate to the point of tangency that corresponds to a place of maximum compaction of the tailings; and
    at least one of a controller and a control system connected to said at least one sensor and calculating at least one of an amount of time or a percentage of time said space between the front plate and the back plate directly adjacent to said at least one sensor is obscured by tailings as the at least one rotating element rotates causing the maximum compaction of the tailings.

9. The system of claim 8, wherein:
    the at least one rotating element further comprises at least one impeller; and
    the at least one protrusion further comprises at least one impeller paddle.

10. The system of claim 9, wherein:
    said at least one sensor being positioned within 30° of the point of tangency.

11. The system of claim 10, wherein:
    said at least one sensor being positioned within 15° of the point of tangency.

12. The system of claim 11, wherein:
    said at least one sensor being positioned within 5° of the point of tangency.

13. The system of claim 9, wherein:
    said at least one of a controller and a control system further calculating an angular velocity of the at least one impeller, said at least one of a controller and a control system further calculating at least one of:
        an amount or a percentage of time to deduct to account for the at least one impeller paddle;
        a velocity of the tailings; and
        a total volume of the tailings passing through the tailings conveyance.

14. The system of claim 9, wherein:
    said at least one sensor further comprising at least one of:
        at least one optical sensor having an emitter and a receiver, one of said emitter and receiver being mounted on the front plate, and the other of said emitter and receiver being mounted on the back plate;

at least one optical sensor having a combined emitter and receiver, and a reflector, one of said combined emitter and receiver and said reflector being mounted on the front plate, and the other of said combined emitter and receiver and said reflector being mounted on the back plate; and at least one optoelectronic sensor or photo diode able to directly measure a distance to a surface directly in front of said at least one sensor.

15. A method for measuring a volume of tailings passing through a tailings conveyance, the tailings conveyance adapted to recycle tailings through a threshing and separating or cleaning system of an agricultural harvester, the tailings conveyance having a housing having an inlet, an outlet, a front plate, a back plate, a wall, at least one rotating element having at least one protrusion, the wall describing an arc proximate to the at least one protrusion over a segment of a circle described by the at least one protrusion as the at least one rotating element rotates, the wall further continuing on a tangent away from the circle described by the at least one protrusion at a point of tangency, comprising the steps of:

positioning at least one sensor proximate to the point of tangency sensing with said at least one sensor whether a space between the front plate and the back plate directly adjacent to said at least one sensor is obscured by tailings as the at least one rotating element rotates at a place of maximum compaction of the tailings; and calculating with at least one of a controller and a control system connected to said at least one sensor at least one of an amount of time or a percentage of time said space between the front plate and the back plate directly adjacent to said at least one sensor is obscured by tailings as the at least one rotating element rotates causing the maximum compaction of the tailings.

16. The method of claim 15, wherein:

the at least one rotating element further comprises at least one impeller; and the at least one protrusion further comprises at least one impeller paddle.

17. The method of claim 16, wherein:

said at least one sensor being positioned within 30° of the point of tangency.

18. The method of claim 17, wherein:

said at least one sensor being positioned within 15° of the point of tangency.

19. The method of claim 18, wherein:

said at least one sensor being positioned within 5° of the point of tangency.

20. The method of claim 16, further comprising the steps of:

calculating with said at least one of a controller and a control system an angular velocity of the at least one impeller;

calculating with said at least one of a controller and a control system at least one of:

an amount or a percentage of time to deduct to account for the at least one impeller paddle;

a velocity of the tailings; and a total volume of the tailings passing through the tailings conveyance.

21. The method of claim 16, wherein:

said at least one sensor further comprising at least one of:

at least one optical sensor having an emitter and a receiver, one of said emitter and receiver being mounted on the front plate, and the other of said emitter and receiver being mounted on the back plate;

at least one optical sensor having a combined emitter and receiver, and a reflector, one of said combined emitter and receiver and said reflector being mounted on the front plate, and the other of said combined emitter and receiver and said reflector being mounted on the back plate; and at least one optoelectronic sensor or photo diode able to directly measure a distance to a surface directly in front of said at least one sensor.

* * * * *